United States Patent
Wang et al.

(10) Patent No.: US 11,758,323 B2
(45) Date of Patent: *Sep. 12, 2023

(54) ACTIVE NOISE CANCELLATION OF EQUIPMENT FAN NOISE ON AIRCRAFT

(71) Applicant: Gulfstream Aerospace Corporation, Savannah, GA (US)

(72) Inventors: Tongan Wang, Savannah, GA (US); Scott Bohanan, Savannah, GA (US); Jim Jordan, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/937,607

(22) Filed: Oct. 3, 2022

(65) Prior Publication Data
US 2023/0022772 A1     Jan. 26, 2023

Related U.S. Application Data

(63) Continuation of application No. 17/223,328, filed on Apr. 6, 2021, now Pat. No. 11,496,831.

(51) Int. Cl.
*H04R 3/00* (2006.01)
*G10K 11/16* (2006.01)
(Continued)

(52) U.S. Cl.
CPC ............. *H04R 3/02* (2013.01); *B64D 47/00* (2013.01); *G10K 11/17881* (2018.01); *H04R 2499/13* (2013.01)

(58) Field of Classification Search
CPC . H04R 3/00; H04R 3/005; H04R 3/02; H04R 3/12; H04R 2203/00;
(Continued)

(56) References Cited

U.S. PATENT DOCUMENTS 5,288,955 A    2/1994 Staple et al.
5,517,571 A    5/1996 Saruta et al.
(Continued)

FOREIGN PATENT DOCUMENTS

CN    103531195 A    1/2014
JP    10266870 A  * 10/1998   ............. F02B 63/04

*Primary Examiner* — Thang V Tran
(74) *Attorney, Agent, or Firm* — LKGlobal | Lorenz & Kopf, LLP

(57) ABSTRACT

The improved active noise cancellation system for forced air heating or cooling systems onboard aircraft employs a duct having a proximal end coupled to the fan unit to entrain the airflow stream in the direction of a distal end of the duct. A reference sensor is positioned within the proximal end of the duct. A means is provided for injecting an audio frequency control signal into the airflow stream in a manner that does not substantially impede the airflow stream. An error sensor is positioned at the distal end of the duct where it is responsive to sounds carried by the airflow stream, including the audio frequency control signal. An electronic circuit coupled to the reference sensor and to the error sensor supplies a noise abating control signal to energize the control transducer and thereby substantially reduce at least one noise harmonic of the fan unit through destructive interference.

15 Claims, 3 Drawing Sheets

(51) Int. Cl.
*H04R 3/02* (2006.01)
*B64D 47/00* (2006.01)
*G10K 11/178* (2006.01)

(58) Field of Classification Search
CPC .. H04R 2499/13; G10K 11/16; G10K 11/175; G10K 11/178; G10K 11/1781; G10K 11/17815; G10K 11/17879; G10K 11/17881; B64D 47/00
See application file for complete search history.

(56) References Cited

U.S. PATENT DOCUMENTS

| | | | |
|---|---|---|---|
| 5,778,081 A | 7/1998 | Patrick | |
| 6,601,054 B1* | 7/2003 | Lo | G05B 5/01 706/14 |
| 7,035,414 B2 | 4/2006 | Daly | |
| 10,870,329 B2 | 12/2020 | Biermann | |
| 11,496,831 B2* | 11/2022 | Wang | G10K 11/17879 |
| 2017/0276398 A1 | 9/2017 | Hanazono et al. | |

\* cited by examiner

ACTIVE NOISE CANCELLATION OF EQUIPMENT FAN NOISE ON AIRCRAFT

CROSS-REFERENCE TO RELATED APPLICATION

This application is a continuation of U.S. patent application Ser. No. 17/223,328, filed Apr. 6, 2021, and issued as U.S. Pat. No. 11,496,831 on Nov. 8, 2022.

TECHNICAL FIELD

The disclosure relates generally to noise abatement in forced air heating or cooling systems for computers and avionics equipment. More particularly, the disclosure relates to active noise abatement in equipment heating or cooling fans deployed in a constrained space on board an aircraft.

BACKGROUND

This section provides background information related to the present disclosure which is not necessarily prior art.

Modern aircraft are filled with avionics systems, flight control computers, and other computer equipment that generate heat. These electronic systems require cooling to prevent delicate components from malfunction or permanent damage. As a general rule of thumb, to avoid permanent damage to components in a microprocessor-based system, it is best to avoid temperatures that exceed +60 to +80 degrees Celsius for a sustained period, depending on the type of components being used. Industrial grade components have an operating range of −40° C. to +85° C.; whereas commercial grade components have a much more limited operating range, typically 0° C. to +70° C. The junction temperature of the components is the key factor in whether the part will be permanently damaged or performance degradation will occur. Thus temperature control through forced air heat transfer is a very important aspect of aircraft design.

Heat removal is an artform, and aircraft systems exist in an environment quite unlike that of an office building. For example, the outside ambient air temperature at thirty-thousand feet is nominally −44.5 degrees Celsius. The air temperature inside an aircraft parked on a ramp in the desert during the summer can exceed +70 degrees Celsius. These temperature extremes notwithstanding, in the passenger compartment when people are present, the ambient temperature is maintained at closer to +20 degrees Celsius. The aircraft thermal engineer needs to take these extreme temperature differences into account when designing heat transfer systems that satisfy both the needs of electronic component temperature stability and occupant comfort. To complicate matters, there is little available space on-board the aircraft to accommodate large heat removal fans, large ductwork and large heat exchangers. Because space and weight are at a premium, heat removal systems onboard aircraft need to be small, and thus typically require much higher airflow rates to achieve sufficient cooling.

Typically, avionics systems and aircraft computer equipment are housed in racks or cabinets located within interior regions of the aircraft, often near the flight deck. The cooling fans needed to maintain proper operating temperatures for avionics systems, and other computer equipment need to move a lot of air (e.g., 190-286 cfm), and thus employ powerful fans that operate at very high speeds (e.g., 5,000 to 20,000 rpm). These fans can produce very high decibel noise levels which occupants cannot tolerate. Conventional treatments like mufflers cannot be used in some applications due to space constraints.

SUMMARY

The disclosed system uses active noise cancellation to greatly attenuate equipment fan noise within the aircraft, without occupying additional space, as would be required by conventional mufflers. The disclosed system is designed to adaptively remove fan noise normally dominated by harmonics related to the blade passive frequency of the rotor. The active noise cancellation algorithm obtains a reference signal by measurement from a reference sensor, such as a reference microphone, vibration sensor, accelerometer, or derived from an input signal to the cooling fan. The system includes a control transducer, such as a loudspeaker or piezoelectric transducer which generates a signal designed to cancel the fan noise. Any residual noise after such cancellation is measured by an error sensor, such as a microphone or piezoelectric transducer, located downstream of the control transducer. The error sensor provides this error signal information to the active noise cancellation algorithm.

The active noise cancellation algorithm preferably implements an adaptive filter based on a filtered least-mean-square (FxLMS) algorithm. This algorithm generates the control signal, supplied to the control transducer, based on the reference signal and the error signal.

The control transducer of the active noise cancelling system is positioned in a guided duct to avoid impacting the cooling flow from the fan. In an alternate embodiment the control transducer is mechanically coupled to a diverter surface, converting the diverter surface into a radiating source, to inject fan noise-cancelling vibrations into the air stream. Both embodiments thus effect active noise cancellation without appreciably interfering with or increasing the size of the fan system or its associated air handling ductwork.

In one aspect the disclosure sets forth an improvement in an active noise cancellation system for forced air aircraft equipment heating or cooling systems of the type having at least one motor-driven fan unit which produces an airflow stream to add or remove heat. The improvement employs a duct, coupled to the fan unit at its proximal end to entrain the airflow stream in the direction of a distal end of the duct. The duct has a mouth at the distal end. A reference sensor is positioned within the proximal end of the duct, and an error sensor is positioned within the distal end of the duct.

An airflow diverter extending axially within the duct is positioned to direct the airflow stream away from the center of the duct and to produce a sheltered region of reduced velocity airflow separation proximate the diverter in the distal end of the duct. The airflow diverter may be an integral part of the fan unit. A control transducer, positioned in the sheltered region, is operable when energized to introduce an acoustic audio wave into the duct. The error sensor is responsive to sounds carried by the airflow stream and to the acoustic audio wave introduced by the control transducer. An electronic circuit coupled to the reference sensor and to the error sensor and supplies a noise abating control signal to energize the control transducer and thereby substantially reduce at least one noise harmonic of the fan unit through destructive interference.

In another aspect the improvement employs a duct having a proximal end coupled to the fan unit to entrain the airflow stream in the direction of a distal end of the duct. The duct has a mouth at the distal end. A reference sensor is positioned within the proximal end of the duct and an error sensor is positioned within the distal end of the duct.

A control transducer is positioned and operable when energized to transfer mechanical vibrations to the fan unit and thereby introduce an audio frequency control signal into the airstream. The error sensor is responsive to sounds carried by the airflow stream, including the audio frequency control signal.

An electronic circuit coupled to the reference sensor and to the error sensor and supplies a noise abating control signal to energize the control transducer and thereby substantially reduce at least one noise harmonic of the fan unit through destructive interference.

In a further aspect the disclosure sets forth an improvement in active noise cancellation system for forced air cooling systems onboard aircraft of the type having at least one motor-driven fan unit which produces an airflow stream to remove heat. The improvement employs a duct having a proximal end coupled to the fan unit to entrain the airflow stream in the direction of a distal end of the duct. The duct has a mouth at the distal end. A reference sensor is positioned within the proximal end of the duct and an error sensor is positioned at the distal end of the duct.

A means is provided for injecting an audio frequency control signal into the airflow stream in a manner that does not substantially impede the airflow stream.

The error sensor is positioned at the distal end of the duct where it is responsive to sounds carried by the airflow stream, including the audio frequency control signal.

An electronic circuit, coupled to the reference sensor and to the error sensor, supplies a control signal to energize the control transducer. The control signal comprises at least one noise abating frequency to the control transducer.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figure 1:
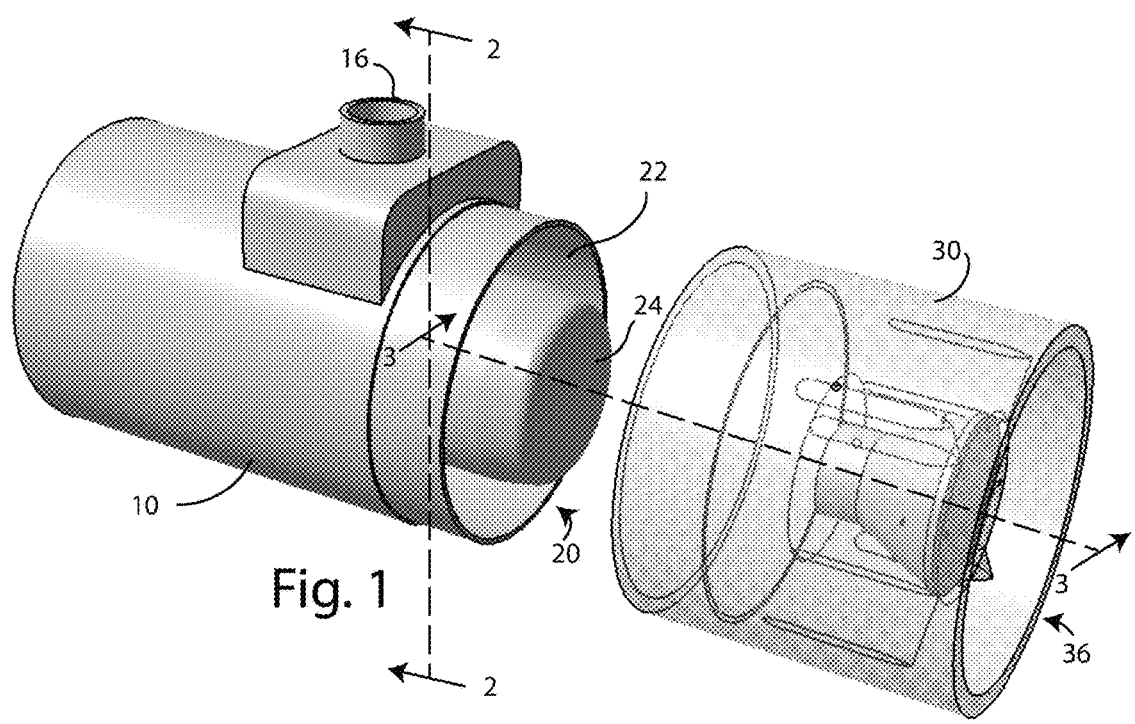
FIG. 1 is a perspective view of an on-board equipment cooling fan, illustrating one configuration for mounting the active noise cancelling transducer to support active noise cancellation.
Figure 3:
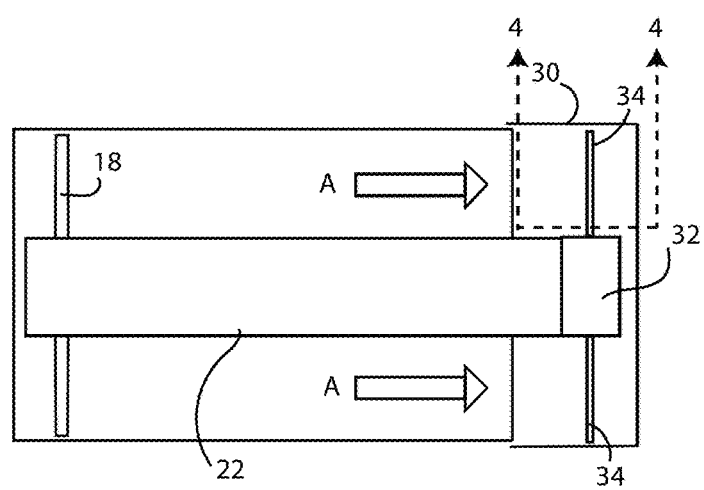
FIG. 3 is a cross sectional view taken along the line 3-3 in FIG. 1, showing the airflow path created by the forced air cooling system and the positioning of the active noise cancelling transducer.
Figure 6:
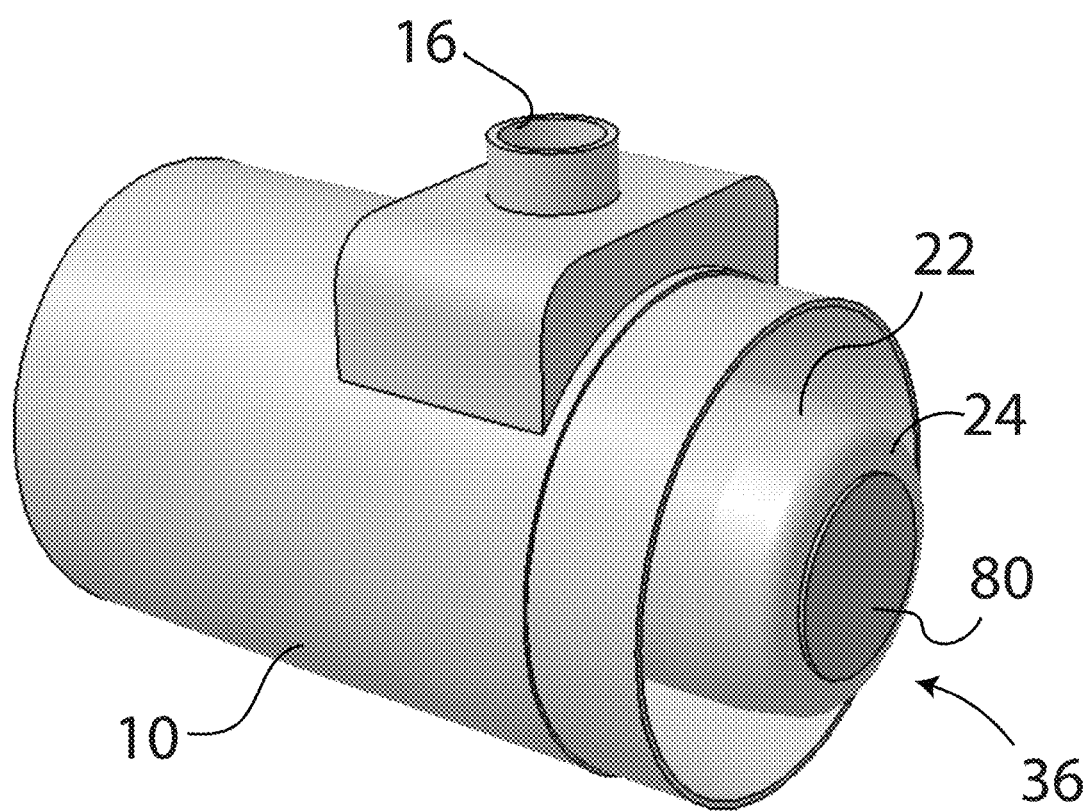
FIG. 6 is a perspective view of an alternate embodiment, employing a vibration transducer integrated into the diverter surface.

The disclosed active noise cancellation system employs a control transducer to inject acoustic energy (oscillations or vibrations) that acoustically interferes destructively with the airborne fan noise harmonics, thereby significantly reducing the sound produced by the cooling fan(s). Three embodi-ments of control transducer are described here. In a first embodiment a loudspeaker transducer is positioned downstream of the fan, in a location where it will not be in the main airstream of the fan. In the second embodiment a vibration transducer mechanically couples to the fan unit or diverter surface where it imparts vibrations to the fan body that acoustically interfere with the fan noise harmonics. The first embodiment is shown in FIGS. 1 and 3; the second embodiment is shown in FIGS. 6 and 7. A third embodiment comprises a combination of the first and second embodiments, providing two different mechanisms for injecting the audio frequency control signal to reduce the sound produced by the cooling fan(s).

In an exemplary aircraft deployment, a pair of electronic equipment racks are situated, one on each side of the plane, directly behind the pilot and co-pilot. Each rack is cooled by a cooling fan, operating a very high flow rates (190 cfm at 8,800 rpm on low speed; 286 cfm at 12,500 rpm on high speed). These fans produce very loud sound pressure levels, producing objectionably loud noise carried by the exhaust airflow. This noise has a fundamental audio frequency of around 1600 Hz, with harmonics that can be 10 dB to 15 dB louder than the broadband contents at nearby frequencies. These harmonics are particularly objectionable because they are located in the most sensitive range of the human hearing loudness spectrum.

First Embodiment

Figure 2:
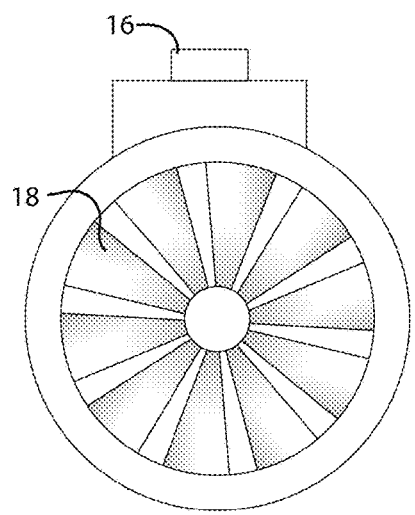
FIG. 2 is a cross sectional view taken along the line 2-2 in FIG. 1, revealing the fan blades of the forced air cooling system.

Referring to FIG. 1, the fan assembly is shown generally at 10. Sitting atop the fan assembly 10 is the electrical cable attachment connector 16. A cable supplying operating power for the fan motor (not shown) and other control circuitry may be supplied through this connector. Inside the fan assembly is a motor driven multi-bladed fan 18, shown in FIG. 2.

When energized, the fan 18 turns at high speed, pulling hot air from the equipment through the bulkhead 14 and exhausts it at the open end 20 of the fan assembly (FIG. 1). Exhaust airflow is channeled outwardly towards the outer periphery of open end 20 by the airflow diverter 22. The path of the exhaust airflow is shown in FIG. 3, at A.

Figure 4:
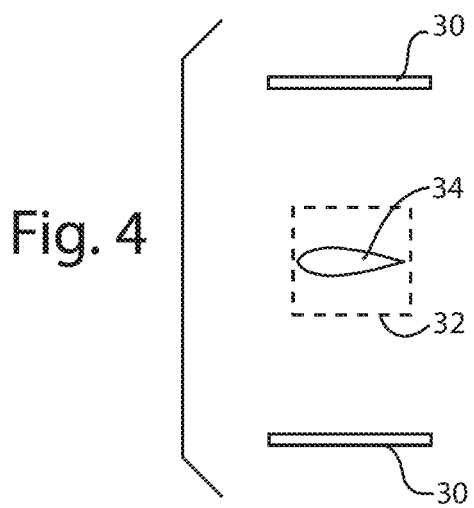
FIG. 4 is a cross-sectional view taken along the line 4-4 in FIG. 3, showing the cross section of the aerodynamic transducer mounting strut.

In this embodiment, a control transducer assembly 30 is attached concentrically over the open end 20 of the fan assembly as illustrated in FIGS. 1 and 3. The control transducer assembly houses the control transducer 32, which may be implemented using a cone loudspeaker or piezoelectric transducer. As illustrated, the control transducer is positioned inside the control transducer assembly 30 so that it sits directly in front of the end cap 24 of the airflow diverter 22. In this position, the control transducer 32 is sheltered, substantially out of the airflow path. Preferably, the control transducer is secured to the sidewalls of the control transducer assembly housing by a plurality of aerodynamic spokes 34. In cross section, these spokes have an aerodynamic shape, as seen in FIG. 4, to minimize interference with the airflow exiting the mouth 36 of the control transducer assembly. As an alternative to using spokes, it is also possible to mount the control transducer directly on the middle of the fan.

Positioned in the center where it is substantially sheltered from direct exhaust airflow, the control transducer 32 is supplied with an amplified acoustic control signal that is specially formulated to cancel out or substantially reduce the sound of the fan blades through destructive interference.

In the above-described structural configuration of the first embodiment, the positioning of the control transducer 32 in the sheltered region behind the airflow diverter functions as one means for injecting an audio frequency control signal into the airflow stream in a manner that does not substantially impede the airflow stream.

Figure 5:
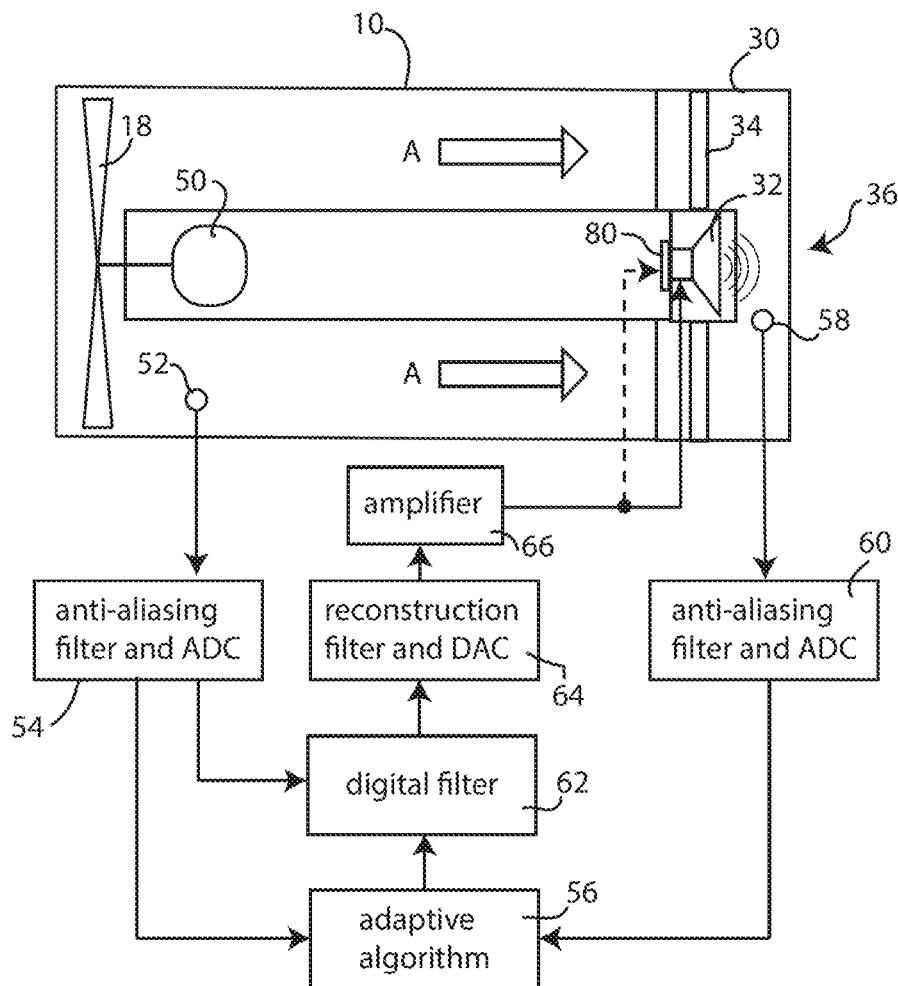
FIG. 5 is a schematic block diagram of the adaptive noise cancelling electronic system.

The electronic circuit for producing the amplified acoustic control signal will now be described in connection with FIG. 5. In FIG. 5, the motor 50 and fan blades 18 have been diagrammatically represented. A reference sensor 52, such as a microphone, vibration sensor, tachometer or accelerometer supplies a reference signal that gives a measure of the frequency content of the fan noise. In this regard, typically the harmonics of the rotational frequency of the fan are responsible for most of the objectionable fan noise. As an alternative, the reference signal may also be derived from the input signal driving the cooling fan, such as from a tachometer. In this embodiment the input signal driving the fan is mathematically related to the rotational speed (fundamental frequency) of the fan. From this mathematical relationship the harmonic frequencies can be calculated. The input-derived reference signal has the advantage over microphone transducers in that such signals are not sensitive to acoustic feedback from the control transducer 32.

The reference signal is processed by an anti-aliasing filter to restrict frequency bandwidth to satisfy the Nyquist-Shannon sampling theorem over the frequency band of interest before the reference signal is sampled and converted to a digital signal using the analog to digital converter ADC. The anti-aliasing filter thus In FIG. 5, the anti-aliasing filter and ADC are depicted by processing block 54.

The reference signal, in digital form, is used as one input to the adaptive algorithm processor 56, which also receives an error signal, in digital form, derived from the error sensor 58 positioned in the mouth 36 of the control transducer assembly 30. The error signal from the error sensor 58 is processed by anti-aliasing filter and ADC processing block 60, which functions in a similar fashion to block 54 described above.

The adaptive algorithm 56 is preferably implemented as a processor which is programmed to perform a least mean squares (LMS) analysis or other suitable algorithm that computes filter coefficients that minimize the difference (error) between the desired signal and the actual signal at the mouth 36 of the control transducer assembly. Specifically, the LMS algorithm finds the least mean square of the error signal using an iterative, stochastic gradient descent method.

FxLMS Algorithm

In the embodiment illustrated in FIG. 5, a filtered-x, least-mean-square (FxLMS) algorithm is implemented. The FxLMS algorithm relies on two signal path inputs to the adaptive algorithm processor 56: a first signal path from error sensor 58 and second signal path from reference sensor 52. These two paths differ in that the error sensor 58 and reference sensor 52 are sampled from different points in the airflow path. To compensate for signal path time delays between these two paths a reconstruction filter 64 is used, as further discussed below.

While the filtered least-mean-square algorithm has been illustrated in FIG. 5, alternate algorithms may be used, such as the least-mean-square algorithm, or the recursive least square (RLS) algorithm. Other algorithms are also possible.

The adaptive algorithm processor 56 uses the error signal and the reference signal to estimate filter parameters which are supplied to digital filter 62. The digital filter 62 may be implemented, for example, as a finite impulse response (FIR) filter having a plurality of taps configured by the supplied filter parameters to estimate the transfer function from the reference microphone to the error microphone. By inverting the phase (or mathematical sign) of the output of the digital filter, a control signal (noise cancelation signal) is generated.

As noted above, this control signal is processed by the reconstruction filter 64 to remove artifacts resulting from the fact that two signal paths have been used. The control signal is then converted into an analog signal by the associated digital to analog converter (DAC), shown as part of the reconstruction filter block 64. The control signal is formulated by the adaptive algorithm 56 and provides audio frequency signals that substantially cancels or abates the noise produced by the fan 18. Specifically, the control signal is formulated to cancel out audio harmonics related to the blade passive frequency of the fan rotor. This control signal is amplified by amplifier 66 and then supplied to the control transducer 32, which injects the control signal as an audio frequency acoustical signal to substantially cancel or abate the noise produced by the fan 18.

Second Embodiment

In the second embodiment, shown in FIG. 6, noise is cancelled by operation of a control transducer, such as vibration transducer 80, which is mechanically coupled to the diverter surface 24, converting the diverter surface 24 into a radiating source to cancel the downstream noise. In this second embodiment, there is no need for the control transducer assembly 30 of the first embodiment, although the control transducer 30 may be optionally included to allow both noise cancelling mechanisms to substantially abate fan noise.

Activation of this electrically operated vibration transducer 80 is affected by the electronic circuit of FIG. 5, by supplying the amplified control signal from amplifier 66 to the vibration transducer 80, as illustrated by the dotted signal line in FIG. 5. Accordingly, the vibration transducer 80 serves as a control transducer that is positioned and operable, when energized, to transfer mechanical vibrations to the fan unit 10 (via the diverter surface 24). This introduces an audio frequency control signal into the airstream to cancel the downstream noise.

Third Embodiment

In a third embodiment the first and second embodiments are combined, such that both the control transducer assembly 30, including control transducer 32, and the vibration transducer 80 are used concurrently. In this embodiment the control transducer 32 and the vibration transducer 80 can be adapted to handle different frequency components of the fan noise spectrum, if desired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An active noise cancellation system for forced air heating or cooling systems onboard aircraft of the type having at least one motor-driven fan unit which produces an airflow stream to add or remove heat, the system comprising:
   a duct having a proximal end coupled to the fan unit to entrain the airflow stream in the direction of a distal end of the duct, the duct having a mouth at the distal end;
   a reference sensor positioned within the proximal end of the duct;
   a control transducer physically coupled to the fan unit or to a component of the fan unit, the control transducer positioned and operable when energized to transfer mechanical vibrations to the fan unit and thereby introduce an audio frequency control signal into the airflow stream;
   an error sensor positioned at the distal end of the duct where it is responsive to sounds carried by the airflow stream, including the audio frequency control signal; and
   an electronic circuit coupled to the reference sensor and to the error sensor and supplying a noise abating control signal to energize the control transducer and thereby substantially reduce at least one noise harmonic of the fan unit through destructive interference.

2. The system of claim 1, wherein the electronic circuit includes a processor programmed to implement an adaptive algorithm selected from the group consisting of: least-mean-square, filtered least-mean-square and recursive least square.

3. The system of claim 1, wherein the reference sensor and error sensor are each selected from the group consisting of: microphone, vibration sensor, tachometer and accelerometer.

4. The system of claim 1, wherein the reference sensor is coupled to a drive circuit of the fan unit and configured to derive a reference signal from the drive circuit.

5. The system of claim 1, wherein the control transducer is a piezoelectric vibration transducer.

6. The system of claim 1, wherein the control transducer is physically coupled to a surface of the fan unit to convert the surface of the fan unit into a sound radiating source that injects noise-cancelling vibrations into the airflow stream.

7. The system of claim 1, wherein the control transducer is physically coupled to the fan unit such that, when energized, the control transducer imparts mechanical vibrations to the fan unit that acoustically interfere with fan noise harmonics of the fan unit.

8. An active noise cancellation system for forced air aircraft equipment heating or cooling systems of the type having at least one motor-driven fan unit which produces an airflow stream to add or remove heat, the active noise cancellation system comprising:
   a duct having a proximal end coupled to the fan unit to entrain the airflow stream in the direction of a distal end of the duct, the duct having a mouth at the distal end;
   a reference sensor positioned within the proximal end of the duct;
   an airflow diverter extending axially within the duct and positioned to direct the airflow stream away from the center of the duct and to produce a sheltered region of reduced velocity airflow separation proximate the diverter in the distal end of the duct;
   a control transducer coupled to the airflow diverter and operable when energized to transfer mechanical vibrations to the airflow diverter and thereby introduce an audio frequency control signal into the airflow stream;
   an error sensor positioned at the distal end of the duct where it is responsive to sounds carried by the airflow stream and to the audio frequency control signal introduced by the control transducer; and
   an electronic circuit coupled to the reference sensor and to the error sensor, and configured to supply a noise abating control signal to energize the control transducer and thereby substantially reduce at least one noise harmonic of the fan unit through destructive interference.

9. The system of claim 8, wherein the airflow diverter forms an integral part of the fan unit.

10. The system of claim 8, wherein the electronic circuit includes a processor programmed to implement an adaptive algorithm selected from the group consisting of: least-mean-square, filtered least-mean-square and recursive least square.

11. The system of claim 8, wherein the reference sensor and error sensor are each selected from the group consisting of: microphone, vibration sensor, tachometer and accelerometer.

12. The system of claim 8, wherein the reference sensor is coupled to a drive circuit of the fan unit, and is configured to derive a reference signal from the drive circuit.

13. The system of claim 8, wherein the control transducer comprises a piezoelectric vibration transducer.

14. The system of claim 8, wherein the control transducer is mechanically coupled to a surface of the airflow diverter to convert the surface of airflow diverter into a sound radiating source that injects noise-cancelling vibrations into the airflow stream.

15. The system of claim 8, wherein the control transducer is mechanically coupled to the fan unit such that, when energized, the control transducer imparts mechanical vibrations to the fan unit that acoustically interfere with fan noise harmonics of the fan unit.

* * * * *